United States Patent
Jenkins et al.

(10) Patent No.: US 10,518,446 B1
(45) Date of Patent: Dec. 31, 2019

(54) LENS HEATSINK INSERT

(71) Applicant: Facebook Technologies, LLC, Menlo Park, CA (US)

(72) Inventors: Kurt Jenkins, Sammamish, WA (US); Jeffrey Taylor Stellman, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 208 days.

(21) Appl. No.: 15/650,226

(22) Filed: Jul. 14, 2017

(51) Int. Cl.
| | |
|---|---|
| *B29C 45/00* | (2006.01) |
| *B29C 45/73* | (2006.01) |
| *B29C 45/76* | (2006.01) |
| *B29D 11/00* | (2006.01) |
| *C03B 11/12* | (2006.01) |

(52) U.S. Cl.
CPC ...... *B29C 45/0046* (2013.01); *B29C 45/0001* (2013.01); *B29C 45/7331* (2013.01); *B29C 45/76* (2013.01); *B29D 11/00009* (2013.01); *C03B 11/125* (2013.01)

(58) Field of Classification Search
None
See application file for complete search history.

(56) References Cited

U.S. PATENT DOCUMENTS

| | | | | |
|---|---|---|---|---|
| 2006/0065018 | A1* | 3/2006 | Leu | C03B 11/086 65/37 |
| 2008/0303179 | A1* | 12/2008 | Tanaka | C03B 11/122 264/1.1 |
| 2015/0047393 | A1* | 2/2015 | Luo | C03C 21/002 65/30.14 |
| 2018/0345361 | A1* | 12/2018 | Ottinger | B33Y 10/00 |

* cited by examiner

*Primary Examiner* — Lisa L Herring
(74) *Attorney, Agent, or Firm* — Kilpatrick Townsend & Stockton LLP

(57) ABSTRACT

Techniques disclosed herein relate to molding inserts with improved cooling performance. A mold insert includes a body and a plurality of heat sink elements coupled to the body. The body includes an area with a recessed surface that has different depths in a plurality of different regions. The plurality of heat sink elements is configured to provide different thermal resistances in the plurality of different regions of the mold insert, where a thermal resistance of the mold insert in a region with a higher recessed surface depth is lower than a thermal resistance of the mold insert in a region with a lower recessed surface depth. In some embodiments, the plurality of heat sink elements form cooling channels that are configured to conduct a cooling fluid from regions of the mold insert with higher recessed surface depths to regions of the mold insert with lower recessed surface depths.

20 Claims, 10 Drawing Sheets

LENS HEATSINK INSERT

BACKGROUND

It is generally costly and time consuming to use machining processes, such as grinding, polishing, and lapping, to produce optical components, and in particular, optical components with complex features. Molding techniques may be used to efficiently manufacture optical components with various shapes, such as spherical or aspheric lenses, lens arrays, cylindrical lenses, v-grooves, etc.

During a molding process, raw materials may be melted, pressure may be applied to the melted materials in a mold designed for a desired optical component, and the molded optical component may then be gradually cooled down before the optical component is removed from the mold. During the cooling process, excessive stress may be built inside the molded optical component if the optical component is not cooled down isothermally in different regions. On the other hand, cooling down the molded optical component slowly to maintain the isothermal condition may prolong the manufacturing process and reduce the manufacturing productivity.

SUMMARY

The present disclosure generally relates to molding techniques. In certain embodiments, mold inserts with multiple heat sink elements may be designed and manufactured for uniformly cooling molded optical devices, such as molded lenses, at a faster rate and with less residual stress in the molded optical devices. The mold inert with multiple heat sink elements may have different thermal resistances at different regions of the mold insert to keep the thick and thin regions of the molded devices in thermal equilibrium during the cooling process. The heat sink elements of the mold insert may form paths for a cooling fluid, which may be supplied to the mold insert to, in combination with the heat sink elements, maintain an isothermal condition at the interface between the molded device and the mold insert.

In some embodiments, a mold insert may include a body having an area with a recessed surface, and a plurality of heat sink elements coupled to the body. The recessed surface may have different depths in a plurality of different regions of the mold insert. The plurality of heat sink elements may be configured to provide different thermal resistances in the plurality of different regions of the mold insert, where a thermal resistance of the mold insert in a region with a higher recessed surface depth is lower than a thermal resistance of the mold insert in a region with a lower recessed surface depth. In some implementations, a total thermal resistance in any region within the area with the recessed surface is in a range between 95% and 105% of a threshold value, where the total thermal resistance in a region may include the thermal resistance of the mold insert in the region and a thermal resistance of a component to be molded with the mold insert in the region. In some implementations, the mold insert may be manufactured using a three-dimensional printing process.

In some implementations of the mold insert, the plurality of heat sink elements may include heat sink elements of different dimensions, structures, shapes, or separation distances. In various implementations, the plurality of heat sink elements may include a plurality of pins, rods, spikes, straight fins, or flared fins. In some implementations, at least some of the heat sink elements may have uneven surfaces. Some of the heat sink elements may include internal tunnels for conducting a cooling fluid. Some heat sink elements that are near edges of the mold insert may be coated with a phase-change material.

In some implementations, a ratio between a maximum depth of the recessed surface and a minimum depth of the recessed surface may be greater than 3. In some implementations, the recessed surface may have a maximum depth in a center region of the mold insert, and the mold insert may include a conduit for conducting a cooling fluid to the mold insert, the conduit located in the center region of the mold insert. The cooling fluid may include an air or a liquid. The plurality of heat sink elements may be configured to form paths for conducting the cooling fluid from the center region to edges of the mold insert. The paths may include radial paths or a spiral path.

In certain embodiments, a molding system may include one or more mold inserts. A mold insert may include a body having an area with a recessed surface, and a plurality of heat sink elements coupled to the body. The recessed surface may have different depths in a plurality of different regions of the mold insert. The plurality of heat sink elements may be configured to provide different thermal resistances in the plurality of different regions of the mold insert, where a thermal resistance of the mold insert in a region with a higher recessed surface depth is lower than a thermal resistance of the mold insert in a region with a lower recessed surface depth.

In certain implementations of the molding system, the plurality of heat sink elements may include heat sink elements of different dimensions, structures, shapes, or separation distances. In some implementations, the plurality of heat sink elements may be configured to form paths for conducting a cooling fluid from a center region of the mold insert to edges of the mold insert. In some implementations, a total thermal resistance in any region within the area with the recessed surface may be in a range between 95% and 105% of a threshold value, where the total thermal resistance in a region may include the thermal resistance of the mold insert in the region and a thermal resistance of a component to be molded with the mold insert in the region.

In certain embodiments, a method of molding an optical device may include providing a mold insert, providing a melted material in the mold insert, allowing the melted material to cool down; and removing the optical device from the mold insert. The mold insert may include a body and a plurality of heat sink elements coupled to the body. The body may include an area with a recessed surface, where the recessed surface may have different depths in a plurality of different regions of the mold insert. The plurality of heat sink elements may be configured to provide different thermal resistances in the plurality of different regions of the mold insert, where a thermal resistance of the mold insert in a region with a higher recessed surface depth is lower than a thermal resistance of the mold insert in a region with a lower recessed surface depth.

In some implementations of the method of molding an optical device, the recessed surface may have a maximum depth in a center region of the mold insert, and the plurality of heat sink elements may form paths for conducting a cooling fluid from the center region of the mold insert to edges of the mold insert. The method may further include supplying the cooling fluid to the center region of the mold insert. In some implementations, the mold insert may be configured and the cooling fluid may be supplied to maintain an isothermal condition at the recessed surface.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION

Figure 1:
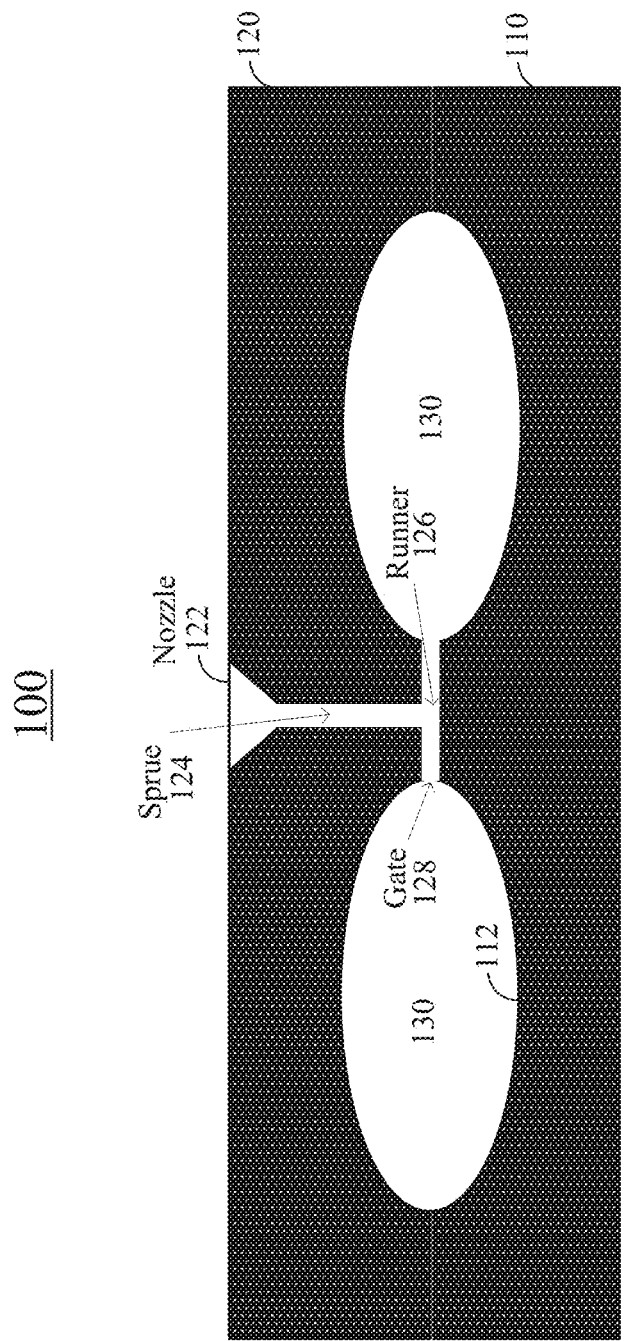
FIG. 1 illustrates a simplified mold for injection molding, according to certain embodiments.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

This invention generally relates to techniques for more uniformly cooling molded components, such as molded plastic or glass lenses. More specifically, techniques disclosed herein provide a cooling system that has different thermal resistances at different regions to keep the thick and thin regions of the molded components in thermal equilibrium during the cooling process. The cooling system may include a mold insert with specially designed heat sink elements (e.g., fins, rods, spike, etc.) for providing different thermal conductance in different regions. The heat sink elements may also form one or more paths with an appropriate pattern for conducting a cooling fluid. An isothermal condition may thus be maintained at the interface between the molded component and the mold insert by the heat sink elements and the cooling fluid.

The cooling system disclosed herein can more uniformly cool down the molded components in different regions, thus reducing or eliminating internal stress and/or reducing manufacture cycle time. For example, lenses made with techniques disclosed herein can have less or no optical and mechanical defects, and may have better controlled tolerances in physical dimensions. Furthermore, a lens with a large variation in thickness in different regions may be manufactured with less or no defects using the disclosed techniques.

As used herein, thermal conductivity may refer to the property of a material to conduct heat, and may have a unit of watts per kelvin-meter (W/(mxK)). The reciprocal of thermal conductivity may be referred to as thermal resistivity, which may be expressed in kelvin-meters per watt (Kxm/W). Thermal conductance and its reciprocal, thermal resistance, may refer to a thermal conductive property of a particular component, and may be calculated based on the thermal conductivity (or resistivity) of the material of the component and a thickness of the component. Thermal conductance may indicate the quantity of thermal energy that can pass through a plate of a particular area and thickness in unit time when the opposite faces of the plate differ in temperature by one kelvin. Thermal resistance may indicate the temperature difference across a structure when a unit of thermal energy flows through it in unit time. Thermal conductance may be expressed in units of watts per kelvin (W/K), and thermal resistance may be expressed in units of kelvins per watt (K/W).

As used herein, a mold insert may refer to any mold structure that can be used in a molding system to form a cavity for molding a component of a desired shape. A molding system may include one or more mold inserts. In some cases, the mold insert may be a mold or a part of a mold. A mold insert may include one or more pieces. In some cases, a mold insert may include at least one interchangeable piece that can be replaced in the molding system. In some cases, a mold insert may be compressed by the molding system in order to form the component of the desired shape.

Optical components, such as spherical or aspheric lenses, may be made by grinding and polishing techniques, single-point diamond turning techniques, or molding techniques. Many types of optics, including glass optics, plastic (polymer) optics, polymer on glass or metal, lens or mirror arrays, optics with spherical surface, aspheric surface, or arbitrary shapes, low-precision and high precision optics, may be made by, for example, injection molding or precision glass molding (PGM).

Injection molding is a manufacturing process for producing components by injecting raw materials into a mold. In injection molding, a raw material may be fed into a heated barrel, mixed, and forced into a mold cavity, where the melted raw materials may be cooled and hardened to a shape defined by the mold cavity. Injection molding can be performed using a variety of raw materials, including, for example, metals, glasses, elastomers, confections, and thermoplastic and thermosetting polymers.

FIG. 1 illustrates a simplified injection mold 100 for injection molding, according to certain embodiments. Injection mold 100 may include a bottom plate 110 and a top plate 120. Melted raw material can enter one or more mold cavities 130 through a nozzle 122, a sprue 124, a runner 126, and gates 128 in the injection mold. The melted raw material may flow through runner 126 and enter one or more specialized gates 128 and into the cavities 130 to form the desired component. Runner 126 may be machined into the surfaces of the top plate 120 and/or the bottom plate 110. Injection mold 100 may include a single cavity or multiple cavities. In injection molds with multiple cavities, each cavity may be identical to form components with the same dimensions or may be unique and form multiple components with different dimensions in a single molding cycle. Injection molds may generally be made from metal, such as steel or aluminum, and may be precision-machined to form the features of the desired component. The top or bottom plate may be a single piece, or may include an interchangeable piece. By substituting the interchangeable piece, an injection mold may be used to produce components with different dimensions. In some cases, the top plate and the bottom plate may form a single piece.

During the molding process, raw materials (e.g., in the forms of powders or pellets) may be fed into a heated barrel with a reciprocating screw. Upon entrance to the barrel, the raw material may be heated and the viscosity of the raw material is reduced, which enables the raw material to flow due to the driving force of the injection unit. The reciprocating screw may deliver the raw material forward, mix and homogenize the raw material, and reduce the heating time by mechanically shearing and frictionally heating the raw material. The raw material may be collected at the front of the screw into a volume referred to as a shot. A shot is the volume of material that is used to fill the mold cavity, compensate for shrinkage, and provide a cushion. When enough material has been gathered, the material is forced at a high pressure and velocity into the mold cavity, for example, in less than one second, such that no material solidifies before the cavity is filled. A packing pressure may be applied until the gate solidifies. Due to its small size, the gate is normally the first place to solidify. Once the gate solidifies, no more material can enter the cavity. The material within the mold is then cooled so that it can solidify. Once the desired temperature has been reached, the mold may be opened and one or more pins, sleeves, strippers, etc. may be driven forward to eject the component. The mold may then be closed and the molding process may repeated.

The cooling of the molded component may generally be performed by passing a cooling fluid (e.g., air, water, or oil) through one or more cooling channels in the mold plates. The cooling channels may be connected by hoses to form a continuous pathway. The cooling fluid may absorb heat from the injection mold (which has absorbed heat from the hot material) and keep the mold at a proper temperature to solidify the plastic at an appropriate rate. The cooling duration may be reduced significantly by circulating water or oil from an external temperature controller through the cooling channels.

Figure 2:
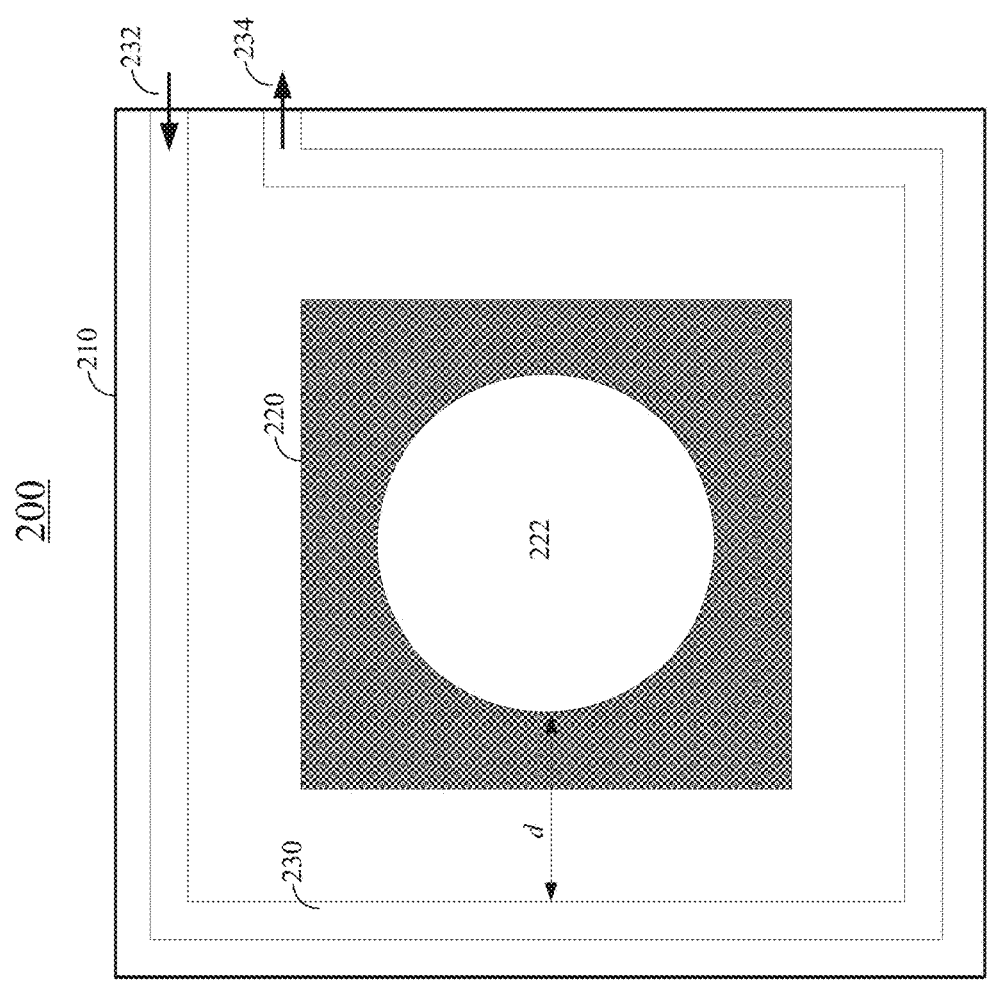
FIG. 2 illustrates an example cooling system of an example molding machine.

FIG. 2 illustrates an example cooling system 200 of an example molding machine. Cooling system 200 may include a mold plate 210 and a mold insert 220 physically coupled to mold plate 210. Mold insert 220 may include a mold cavity 222 that holds the molded component. One or more cooling channels 230 surrounding mold insert 220 may be formed in mold plate 210. Cooling channel 230 may include an inlet 232 and outlet 234. Inlet 232 and outlet 234 may be connected to an external temperature controller/circulator.

During the cooling period, heat from the molded component in cavity 222 may be transferred to mold insert 220 and then to mold plate 210, which may be at a lower temperature than the molded component in cavity 222. For example, the melted raw material may be at about 425° F. to about 500° F. before the cooling process, and mold plate 210 and/or mold insert 220 may be at a temperature of about 170° F. to about 200° F. In some implementations, at least mold insert 220 may be at a temperature similar to the temperature of the melted raw material before the cooling process. A cooling fluid at a lower temperature may be pumped into cooling channel 230 from inlet 232. While passing through cooling channel 230, the cooling fluid may absorb heat transferred to channel 230 from the molded component. The cooling fluid at a higher temperature may exit cooling channel 230 from outlet 234, and may be cooled down and recirculated into cooling channel 230 through inlet 232 by a temperature controller. In some molding systems, the distance d between cooling channel 230 and edges of cavity 222 may be more than an inch, such as about 3-4 inches.

As can be seen from FIG. 2, cooling channel 230 surrounds mold insert 220 and the molded component. Therefore, the edges of the molded component in cavity 222 are closer to cooling channel 230 than the center of the molded component. Thus, the edges of the molded component may be cooled down earlier and faster than the center of the molded component. As such, different locations of the molded component may be at different temperatures. The different temperatures at different locations on the molded component may cause internal stresses, due to, for example, the material's different coefficients of thermal expansion at different temperatures. Thus, the molded component may have various mechanical defects (e.g., cracks) and optical defects (e.g., refractive index non-uniformity, or diffusions and/or reflections at the cracks). Furthermore, it may take long time for the center of the molded component to be cooled down to the desired temperature. For example, the cooling period may be longer than 5 minutes, such as about 6-10 minutes. Thus, the productivity may not be as high as desired for mass production.

Another molding technique for manufacturing optical components is precision glass molding (PGM). Precision glass molding allows the production of high precision optical components from glass without grinding and polishing. It can be used to manufacture precision glass lenses for consumer products (e.g., digital cameras) and high-end products (e.g., medical systems). As injection molding, PGM can be used to cost-effectively manufacture lenses with complex geometries, such as aspheric lenses. The PGM process may be performed on a specialized molding machine, which may precisely control the temperature, travel distance, and force during the molding process. The mold used may withstand high temperatures and pressures, and may be resistant to chemical interaction with glass.

The precision glass molding process may include several steps. First, a glass preform may be loaded into a cavity of the mold (or a mold insert). Oxygen may be removed from the working area by filling the cavity with nitrogen and/or evacuation of the cavity. The mold may then be partially closed, and the entire system of mold and glass may be heated up by, for example, infrared lamps. After reaching a working temperature, which may be between the transition temperature and the softening point of the glass preform, the mold may be closed further and start to press the glass preform at a controlled travel distance. When the final thickness of the optical component is reached, the pressing may be switched to a force-controlled process. After the pressing is completed, the molded optical component may be cooled to a desired temperature before being removed from the mold.

Figure 3A:
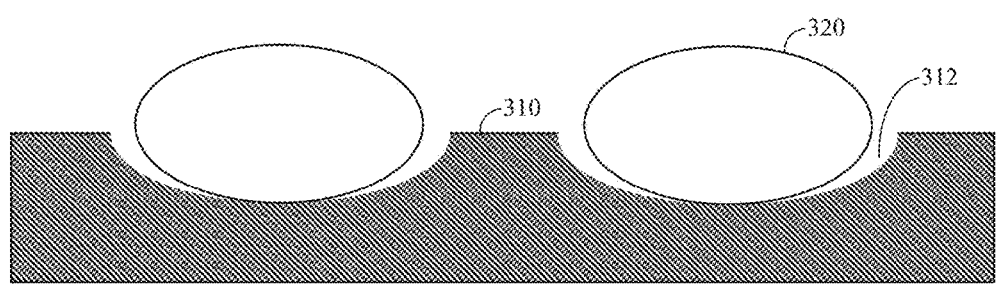
FIG. 3A illustrates a simplified process for precision glass molding where glass preforms are placed in a mold, according to certain embodiments.
Figure 3B:
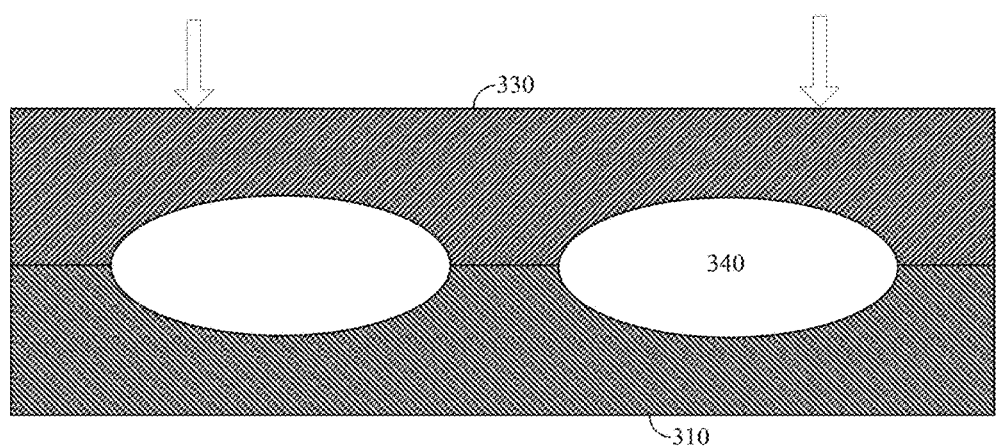
FIG. 3B illustrates a simplified process for precision glass molding where melted glass preforms are pressed in a mold, according to certain embodiments.

FIGS. 3A and 3B illustrate a simplified process for precision glass molding. FIG. 3A illustrates the simplified process for precision glass molding where glass preforms 320 are placed in cavities 312 of a bottom mold insert 310, but before the mold is partially closed. FIG. 3B illustrates the simplified process for precision glass molding where melted glass preforms 320 are pressed in the cavity formed by bottom mold insert 310 and top mold insert 330 at a controlled distance and/or force to form molded component 340, such as a lens.

Because a glass may have a much higher transition temperature or softening temperature, such as 1000° F. or higher, a much higher temperature may be used in the PGM process than in the injection molding process. The material for the mold insert may have sufficient strength, hardness, and accuracy at high temperature and pressure, such as steel with a nickel alloy coating, carbide alloys (e.g., tungsten carbide), aluminum alloys, glasslike or vitreous carbon, silicon carbide, silicon nitride, or a mixture of silicon carbide and carbon. The mold inserts may be fabricated by, for example, powder metallurgy followed by post-machining processes and grinding operations.

A cooling process similar to the cooling process described above with respect to FIG. 2 may be used for cooling the molded optical component, such as a lens, in the PGM process. When the molded lens is cooled down from, for example, a melting temperature of the glass material, different regions of the lens may be cooled down at different rates due to, for example, different thicknesses (and thermal resistances) of the lens at different regions. Thus, the manufactured lens may have various mechanical and optical defects as described above with respect to FIG. 2, due to, for example, internal stresses caused by the different cooling rates and the lens material's different coefficients of thermal expansion at different temperatures. For example, the refractive index of the glass material may become non-uniform in different directions (and thus may cause birefringence) and/or different regions within the lens, and may drop in at least some regions due to the fast cooling. A higher cooling rate may correspond to a larger decrease in the refractive index. A lower cooling rate may reduce or prevent the refractive index drop, but may be less cost-effective due to the longer process time. In addition to the refractive index, the Abbe-number of the glass material, which indicates the dispersion (variation of refractive index with light wavelength) of the glass material, may also change due to fast cooling. Because of the high temperature involved in the PGM, the cooling process in PGM may take a longer time than the injection molding, and may cause more internal stress (and thus more mechanical or optical defects) in the molded optical component due to a faster cooling rate.

In both the existing injection molding techniques and the PGM techniques, at least partially due to the potential defects caused by the cooling process, the shape of the component that can be molded may be limited. For example, a ratio between a maximum thickness of the molded component (e.g., at the center of a lens) and a minimum thickness of the molded component (e.g., at the edges of the lens) may be no greater than 3. As such, the size, numerical aperture, and/or optical power of the lens may be limited.

According to certain aspects of the present disclosure, a cooling system may include a mold insert with specially designed heat sink elements (e.g., fins, rods, spike, etc.) for providing different thermal conductance at different regions to keep the thick and thin regions of the molded component (e.g., lens) in thermal equilibrium during the cooling process. Additionally or alternatively, the heat sink elements may form one or more paths with an appropriate pattern for conducting a cooling fluid. An isothermal condition may thus be maintained at the interface between the molded component and the mold insert by the heat sink elements and the cooling fluid. Molded components made with the techniques disclosed herein, such as optical lenses, can have less or no optical and mechanical defects, and may have better controlled tolerances in physical dimensions. Furthermore, a lens with a large variation in thickness in different regions may be manufactured with less or no defects.

In some embodiments, to provide different thermal conductance to different regions of the molded component, a mold insert may have different numbers of heat sink elements and/or different structures of heat sink elements in different regions. For example, in a region where the molded component is thick, more heat sink elements, more closely spaced heat sink elements, or heat sink elements with larger surface areas (e.g., longer fins or fins with curved or rough surfaces) may be used to reduce the thermal resistance of the mold insert in the region to dissipate heat faster.

Figure 4:
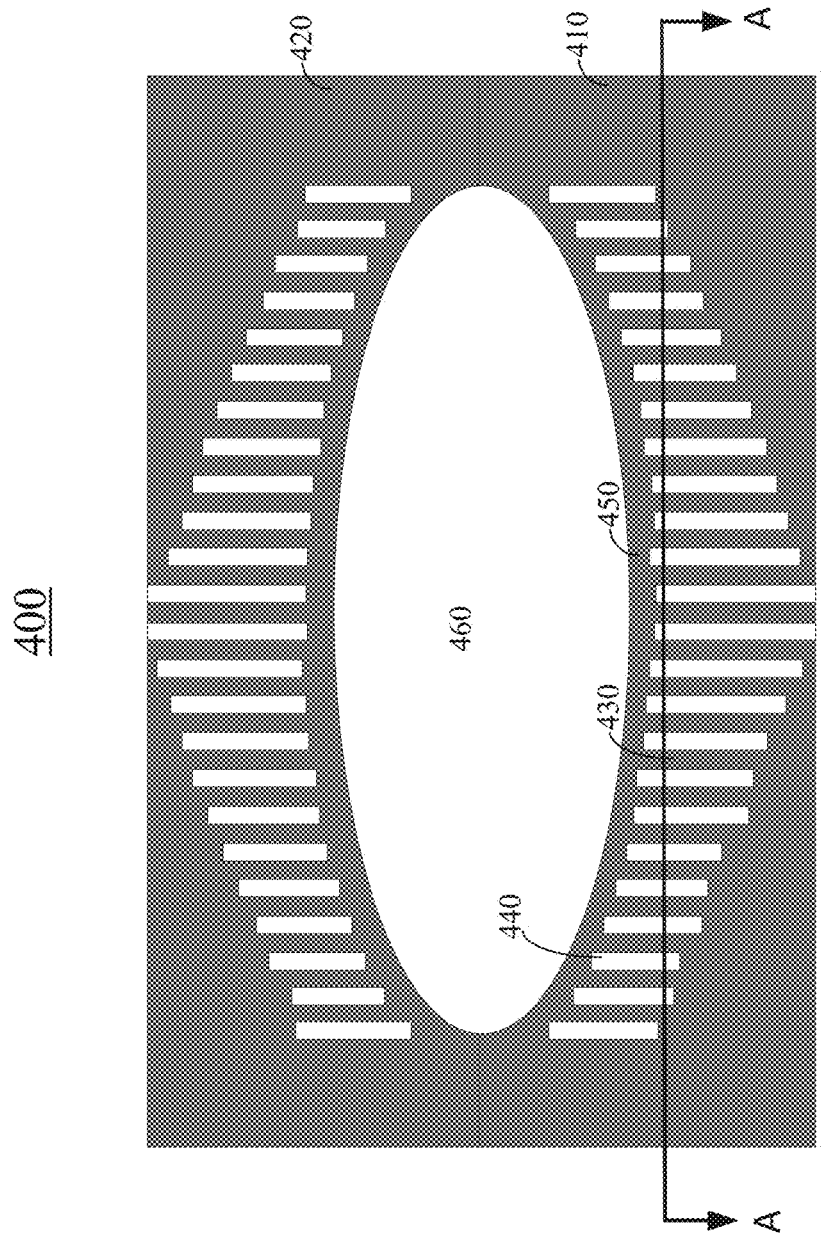
FIG. 4 is a vertical cross-sectional view of an example mold including two mold inserts, according to certain embodiments.

FIG. 4 is a vertical cross-sectional view of an example mold 400 including two mold inserts 410 and 420, according to certain embodiments. Mold inserts 410 and 420 may each include an area with a recessed surface for forming a cavity 460 that resembles the shape of a desired component, such as an optical lens with a specific shape and surface profile. Each of mold inserts 410 and 420 may include a plurality of heat sink elements 430 (e.g., heat sink fins). The layer between the heat sink elements and the mold insert cavity may be referred to as a heat sink base 450. Each heat sink element 430 may be a passive heat exchanger that transfers heat to a cooling fluid (e.g., air or a liquid coolant) passing through cooling channels 440 formed by heat sink elements 430, such that the heat may be dissipated from the molded component through heat sink elements 430 to the cooling fluid. Heat sink elements 430 may have different radiation surface areas due to, for example, different lengths and/or different circumferences of the cross-section of the heat sink elements. The cooling fluid (e.g., air, water, oil, etc.) supplied to cooling channels 440 between heat sink elements 430 may absorb the thermal energy radiated or conducted from heat sink elements 430, and take the thermal energy out of mold inserts 410 and 420 while passing through cooling channels 440.

Heat sink elements 430 may be made of a copper, aluminum, or other metals. Copper may be used because of its high thermal conductivity and durability. Aluminum may be used, for example, in applications where a light weight is desired. Heat sink elements 430 may radiate or conduct heat to the cooling fluid in cooling channels 440 between heat sink elements 430. The thermal conductance (or resistance)

of a heat sink element may depend on its surface area in contact with the cooling fluid surrounding it, and may be a function of material thermal conductivity, dimensions, element type, heat transfer coefficient, cooling fluid flow rate, surface treatment, etc.

It is noted that even though FIG. 4 (and some other examples) may show two mold inserts in a molding system as having similar shapes, one skilled in the art would understand that the two mold inserts may have different shapes. For example, if the component to be molded is not symmetrical, the two mold inserts may have different shapes. In some cases, if the component has a substantially flat surface, only one mold insert may be used.

In general, heat may be lost to the cooling fluid (e.g., an air or liquid) by radiation and conduction/convection. Thermal conduction (and/or convection) may be possible if there is a continuous stream of fluid passing the heat sink elements. Thermal radiation may be effective when the surface of the heat sink element has the maximum emissivity of heat, which may mean that the color and surface condition of the heat sink elements may also affect the thermal radiation efficiency of the heat sink elements. For example, a heat sink element in matte black may be more effective in radiating thermal energy than a chrome plated and shiny heat sink element. Due to radiations to adjacent heat sink elements and limited flow of cooling fluid within spaces between heat sink elements, closely spaced heat sink elements may not be as effective in heat dissipation as expected.

Figure 5:
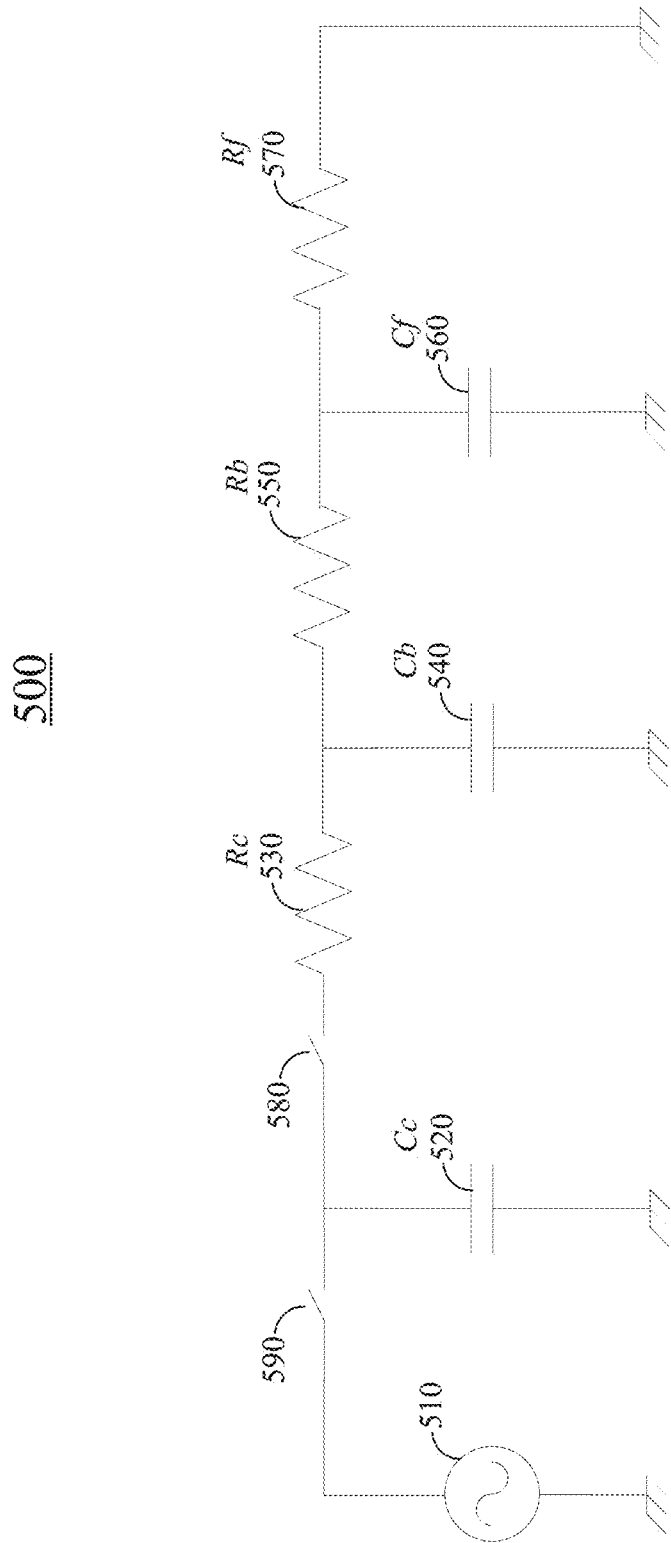
FIG. 5 is a simplified model of an area of a mold insert with a molded component in the mold insert, according to certain embodiments.

FIG. 5 is a simplified model 500 of an area of a mold insert with a molded component in the mold insert, according to certain embodiments. Model 500 includes a thermal generator 510, a component thermal capacitance Cc 520 of the corresponding area of the molded component, a component thermal resistance Rc 530 of the corresponding area of the molded component, a heat sink base thermal capacitance Cb 540 of the corresponding area of the heat sink base (e.g., heat sink base 450), a heat sink base thermal resistance Rb 550 of the corresponding area of the heat sink base, a heat sink element thermal capacitance Cf 560 of a heat sink element in the corresponding area, and a heat sink element thermal resistance Rf 570 of the heat sink element in the corresponding area. As described above, thermal resistance may indicate the temperature difference across a structure when a unit of thermal energy flows through it in unit time. Thermal resistance may be expressed in units of K/W. Thermal capacitance may indicate the ability of a structure to absorb a quantity of heat when its temperature increases by one kelvin (or one degree Celsius). Since the molded component, the heat sink base, and the heat sink elements all have some mass, they all have thermal capacity. Thus, it may take time for the molded component, the heat sink base, and the heat sink elements to be heated up or cooled down, depending on the temperature and thermal capacitance of the molded component and the rate of thermal dissipation of the mold insert.

At the beginning of the molding process, the raw material may be heated by a thermal generator to a melting temperature level, which may be modeled as thermal energy being transferred from thermal generator 510 to component thermal capacitance Cc 520 through a switch 590. The melted raw material may then be provided to the cavity of the mold insert, which may be modeled as opening switch 590. During the cooling process, thermal energy may be transferred from the molded component to the heat sink base, which may be modeled as thermal energy being transferred from component thermal capacitance Cc 520 to heat sink base thermal capacitance Cb 540 through a switch 580 and component thermal resistance Rc 530. While the temperature of the heat sink base goes up, thermal energy may also be transferred to the heat sink element, which may be modeled as thermal energy being transferred through heat sink base thermal resistance Rb 550 to heat sink element thermal capacitance Cf 560. Thermal energy on the heat sink element may then be transferred to the cooling fluid to be removed from the mold insert, which may be modeled as thermal energy being transferred to ground (or a lower temperature level) through heat sink element thermal resistance Rf 570. Thus, the thermal resistance for an area of the mold insert may be modeled by component thermal resistance Rc 530, heat sink base thermal resistance Rb 550, and heat sink element thermal resistance Rf 570. In other words, the total thermal resistance for an area of the mold insert may be the sum of component thermal resistance Rc 530, heat sink base thermal resistance Rb 550, and heat sink element thermal resistance Rf 570.

To maintain an isothermal condition at the interface between the molded component and the mold insert, it may be desirable that the total thermal resistance at any given area of the mold insert is substantially the same, such as with a variation of, for example, less than about +/−10%, +/−5%, or less of a mean, median, or threshold thermal resistance value. In some cases, it may be desirable that the total thermal resistance at areas where the molded component has a higher thickness is lower than the total thermal resistance at areas where the thickness of the molded component is lower, because more thermal energy may be stored in the molded component at areas where the molded component has a higher thickness (and thus a large Cc).

To achieve the desired total thermal resistance at any given area of the mold insert, a theoretical model as described above with respect to FIG. 5 may be used. As described above, the thermal resistance of the heat sink elements may depend on the condition of the cooling fluid. Various approximations known to one skilled in the art may be used to estimate the thermal resistance of a heat sink element based on the cooling fluid flow rate.

In some embodiments, a mold insert may be made and the thermal performance of the mold insert may be measured experimentally and may then be used to improve the design of a new mold insert. Various heat sink manufacturing and testing methods known to one skilled in the art may be used.

In some embodiments, due to the complex nature of the three-dimensional thermal flow, numerical methods, such as computational fluid dynamics (CFD), may be used to design and simulate different heat sink elements for different areas of the mold insert before a physical mold insert is made. Numerical methods, such as CFD, may provide a qualitative (and sometimes quantitative) prediction of fluid flows. The simulation results may be visualized through images or videos.

The designed mold insert may be manufactured using various metal 3D printing techniques, such as powder bed fusion, binder jetting, or metal deposition. For example, in powder bed fusion, an energy source (e.g., a laser or another energy beam) may be used to fuse a layer of metal powder to create each layer of the target objects. In binder jetting, layers of the target objects may be formed by gluing together metal particles and later sintering (or melting) them together in a high-temperature kiln. One metal deposition technique is directed energy deposition (DED) (also referred to as laser cladding), which uses a laser beam to fuse metal powder as the metal powder is slowly released and deposited by a robotic arm to form the layers of a target object. Another metal deposition technique is electron beam additive manufacturing (EBAM) technique, where a powerful electron beam is used to fuse a metal wire (e.g., a titanium wire of about 3 mm thick) and the molten metal is then shaped into larger metal structures.

As described above, more thermal energy may be stored in the molded component at areas where the molded component has a higher thickness. Thus, to maintain the isothermal condition at the interface between the molded component and the mold insert, in any given time period, more thermal energy may need to be dissipated from the areas where the molded component has a higher thickness than from the areas where the molded component has a lower thickness. One way to achieve this is to reduce the thermal resistance of the heat sink element and thus the total thermal resistance in areas where the molded component has a higher thickness, which may be equivalent to reduce R to increase I=V/R in an electrical circuit. Alternatively or additionally, a higher temperature difference may be created at areas where the molded component has a higher thickness to increase the amount of thermal energy dissipated in unit time period, which may be equivalent to increase V to increase I=V/R, where V may be equivalent to the temperature difference between the molded component and the surfaces of the heat sink elements (or the cooling fluid that is in contact with the surfaces of the heat sink elements).

In some embodiments, the heat sink elements on the mold insert may be designed to form one or more paths (also referred to as cooling channels) for the cooling fluid to flow from areas where the thickness of the molded component is higher to areas where the thickness of the molded component is lower. For example, the heat sink elements (and cooling channels) may spread spirally or radially from the center of the mold insert (where a molded optical lens is generally thicker) to the edges of the mold insert (where the molded optical lens is generally thinner), such that the cooling fluid may flow spirally or radially from the center to the edges of the mold insert. A cooling fluid may first be supplied to regions of the mold insert corresponding to the thick regions of the molded component, and may then flow to regions of the mold insert corresponding to the thin regions of the molded component. Because the temperature of the cooling fluid may be at a lower level when it is first supplied to the mold insert, and may be at a higher level as it passes through the mold insert, a higher temperature difference between the molded component and the cooling fluid may be created at the regions where the cooling fluid is supplied early, which correspond to regions where the molded component has a higher thickness.

Figure 6:
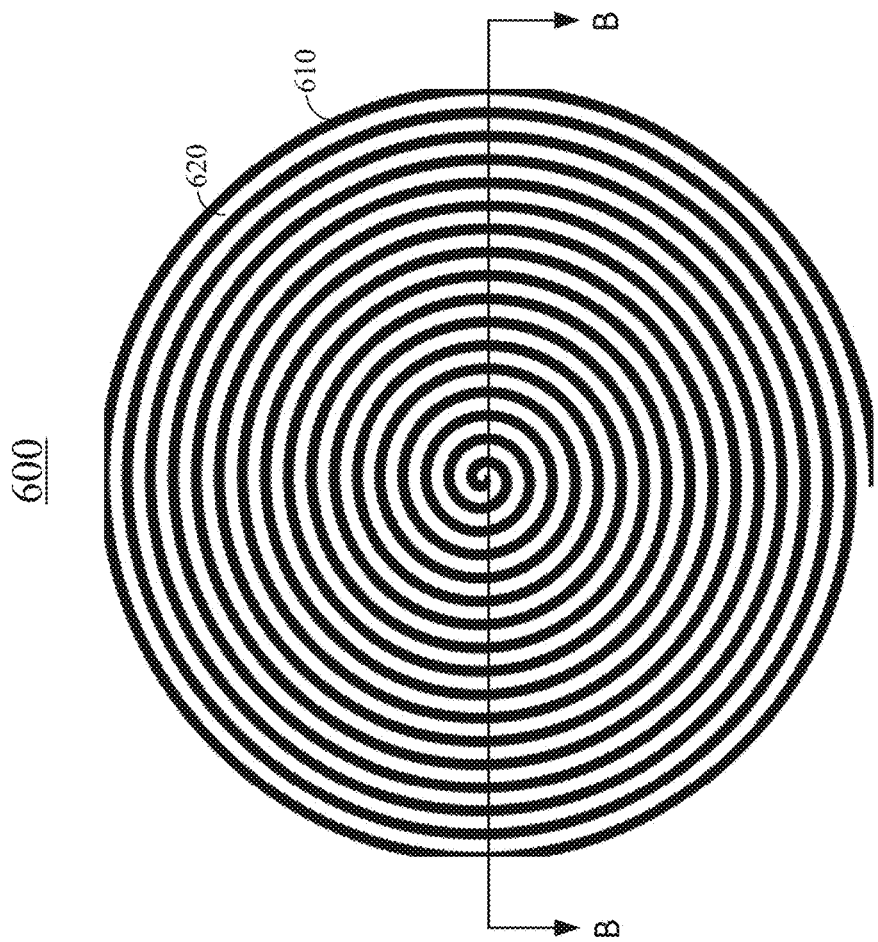
FIG. 6 is a horizontal cross-sectional view of an example mold insert, according to certain embodiments.

FIG. 6 is a horizontal cross-sectional view of an example mold insert 600, according to certain embodiments. In certain implementations, FIG. 6 may be a cross-sectional view of mold insert 410 along line A-A, while FIG. 4 may be a cross-sectional view of mold insert 600 along line B-B. Heat sink elements 610 on mold insert 600 may form or may be a single continuous piece having a spiral pattern. As such, a cooling channel 620 formed by heat sink elements 610 may be a spiral path. Mold insert 600 may include a conduit for conducting a cooling fluid to the center region of mold insert 600. When the cooling fluid is supplied to the center of mold insert 600 though the conduit, the cooling fluid may flow from the center of mold insert 600 spirally along cooling channel 620 to the edges of mold insert 600. In this way, as the cooling fluid absorbs heat on its path and the temperature of the cooling fluid increases gradually along the path, the temperature difference between the molded component and the cooling fluid may be decrease gradually. As described above, the temperature difference may affect the heat dissipation rate of the heat sink, and thus may help to achieve the isothermal condition at the interface between the molded component and the mold insert.

In various implementations, the heat sink elements may be evenly or unevenly distributed or may have uniform or non-uniform dimensions, such that the width of the cooling channel may be uniform or non-uniform. For example, the cooling channel may have a lower width in the center region of the mold insert, and thus the cooling fluid may have a higher velocity and may cool the heat sink element faster. In some cases, individual heat sink elements may be arranged in a spiral pattern, but may not form a continuous spiral piece shown in FIG. 6. In some cases, a cooling fluid at a substantially same temperature may be supplied to a same location on the mold insert at a constant flow rate. In some cases, the flow rate, location of supply, and/or temperature of the cooling fluid may be varied during the cooling process. In various implementations, the heat sink elements of the mold insert may be designed with consideration of, for example, the flow rate, location of supply, flow pattern, and/or temperature of the cooling fluid during the cooling process.

The techniques disclosed above may be implemented using heat sink elements with various dimensions, structures, shapes, or separation distance. For example, in some embodiments, a mold insert may have different numbers of heat sink elements and/or different structures of heat sink elements in different regions. In a region where the molded component is thick, more heat sink elements, more closely distributed heat sink elements, or heat sink elements with larger surface areas (e.g., longer fins or fins with curved or rough surfaces) may be used to reduce the total thermal resistance of the mold insert at the region to dissipate heat faster. In some implementations, at least some heat sink elements may include internal tunnels for conducting a cooling fluid. In various embodiments, the heat sink elements may be in the form of pins, rods, spikes, plates, straight fins, flared fins, etc. For example, the heat sink elements may have a shape of a pyramid with a larger area close to the heat sink base or with a smaller area close to the heat sink base. In some examples, the heat sink elements may have a cross-section in the form of a convex or concave polygon. Some example heat sink element configurations are described below.

Figure 7:
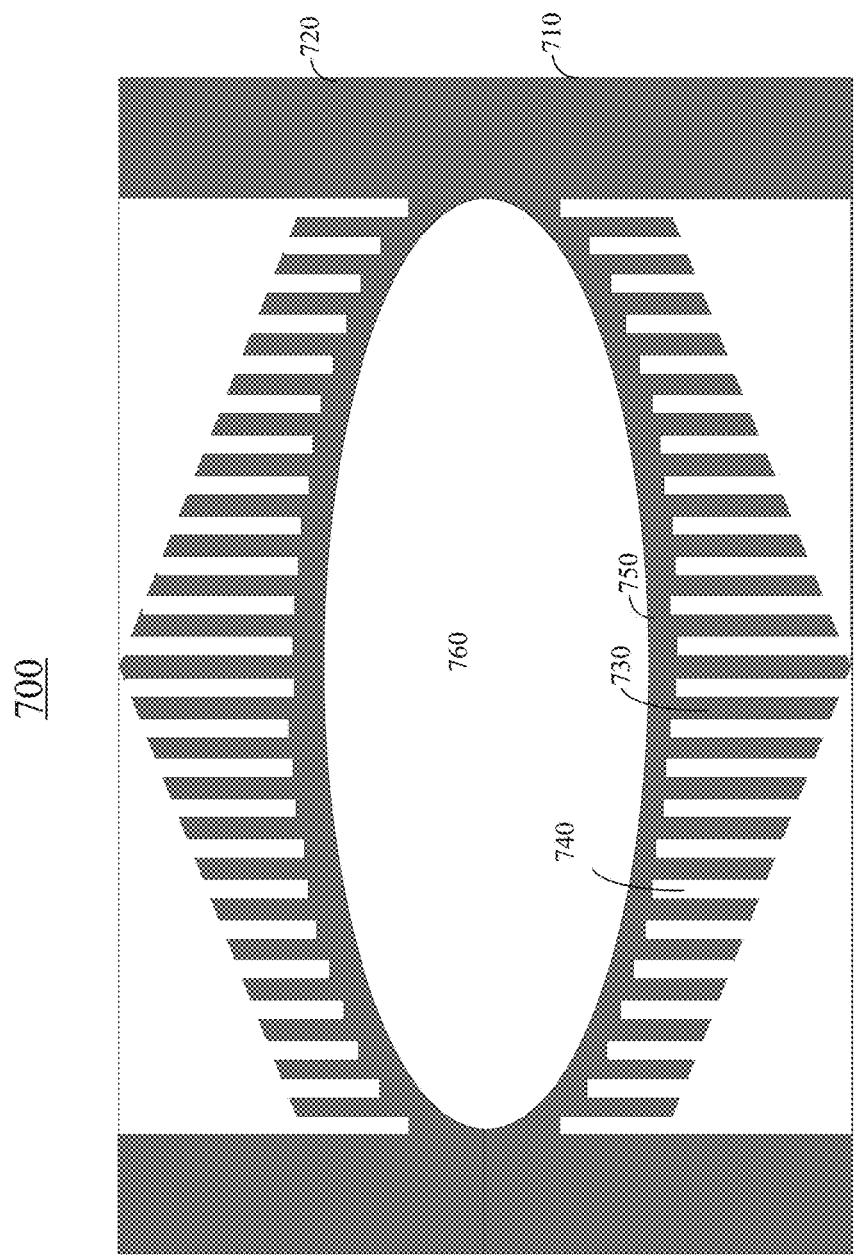
FIG. 7 is a vertical cross-sectional view of an example mold including two mold inserts, according to certain embodiments.

FIG. 7 is a vertical cross-sectional view of an example mold 700 including two mold inserts 710 and 720, according to certain embodiments. Mold 700 may be similar to mold 400 of FIG. 4, but may have open cooling channels rather than closed cooling channels (i.e., tunnels). Mold inserts 710 and 720 may each include an area with a recessed surface for forming a cavity 760 that resembles the shape of a desired component, such as an aspheric optical lens with a specific shape and surface profile. Each of mold inserts 710 and 720 may include a plurality of heat sink elements 730. The layer between the heat sink elements and the mold insert cavity is referred to as a heat sink base 750. Heat sink elements 730 may be passive heat exchangers that transfer heat to a cooling fluid passing through cooling channels 740 formed by heat sink elements 730, such that heat may be dissipated away from the molded component through heat sink elements 730 to the cooling fluid. Heat sink elements 730 may have different radiation surface areas due to, for example, different lengths of the heat sink elements. The cooling fluid (e.g., air, water, oil, etc.) supplied to cooling channels 740 may absorb the thermal energy radiated or conducted from heat sink elements 730, and take the thermal energy out of mold inserts 710 and 720 while passing through cooling channels 740.

Figure 8A:
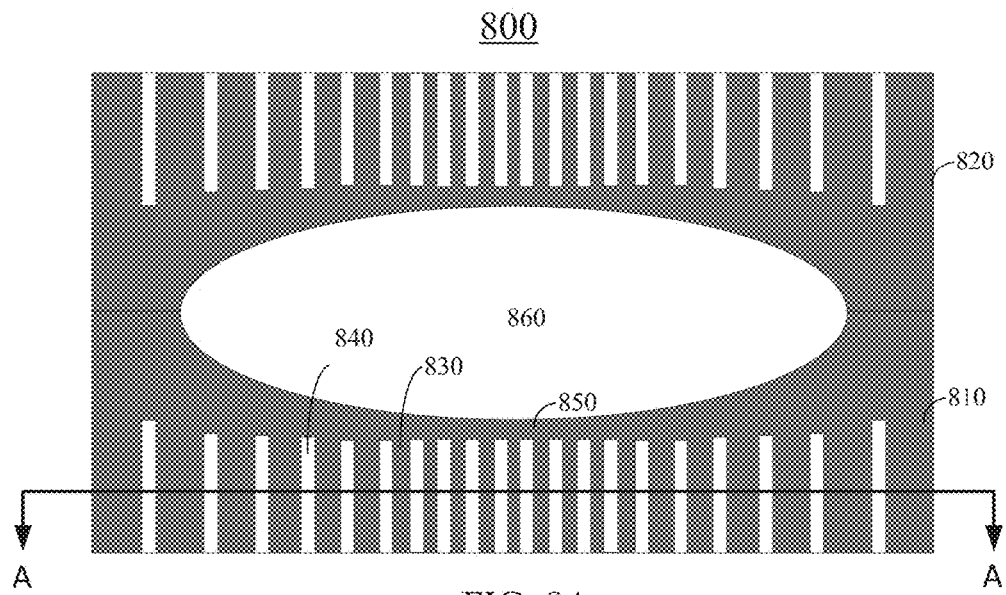
FIG. 8A is a vertical cross-sectional view of an example mold including two mold inserts, according to certain embodiments.

FIG. 8A is a vertical cross-sectional view of an example mold 800 including two mold inserts 810 and 820, according to certain embodiments. Mold inserts 810 and 820 may form a cavity 860 that resembles the shape of a desired component, such as an optical lens with a specific shape and surface profile. Each of mold inserts 810 and 820 may include a plurality of heat sink elements 830. The layer between the heat sink elements and the mold insert cavity is a heat sink base 850. Heat sink elements 830 may be passive heat exchangers that transfer heat to a fluid passing through cooling channels 840 formed by heat sink elements 830, such that heat may be dissipated away from the molded component through heat sink elements 830 to the cooling fluid. Heat sink elements 830 may have a same length (or height), but may have different radiation surface areas due to, for example, different circumferences of the cross-sections of the heat sink elements. Heat sink elements 830 may also have a same length and a same circumference of the cross-section, but may be distributed unevenly in different regions of mold insert 810 or 820. For example, heat sink elements 830 may be more closely distributed in the center region of the mold insert. The cooling fluid (e.g., air, water, oil, etc.) may be supplied to cooling channels 840 and may absorb the thermal energy radiated or conducted from heat sink elements 830 and take the thermal energy out of mold inserts 810 and 820 while passing through cooling channels 840.

Figure 8B:
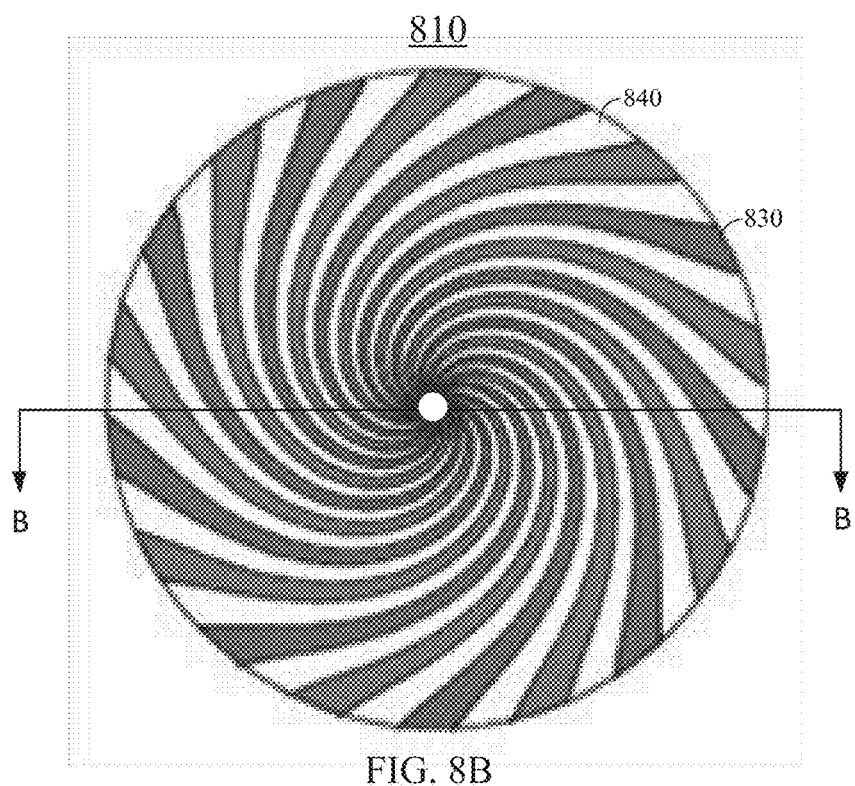
FIG. 8B is a horizontal cross-sectional view of an example mold insert, according to certain embodiments.

FIG. 8B is a horizontal cross-sectional view of an example mold insert, according to certain embodiments. For example, FIG. 8B may be a cross-sectional view of mold insert 810 of FIG. 8A along line A-A, while FIG. 8A may be a cross-sectional view of mold insert 810 of FIG. 8B along line B-B. As shown in FIG. 8B, heat sink elements 830 may have a radial and/or spiral shape, and the cross-sections of heat sink elements 830 may gradually increase as heat sink elements 830 extend from the center of mold insert 810 to the edges of mold insert 810. Cooling channels 840 formed by heat sink elements 830 may have a shape similar to or different from the shape of heat sink elements 830. For example, the distance between two heat sink elements may gradually increase from the center of mold insert 810 to the edges of mold insert 810.

Figure 9A:
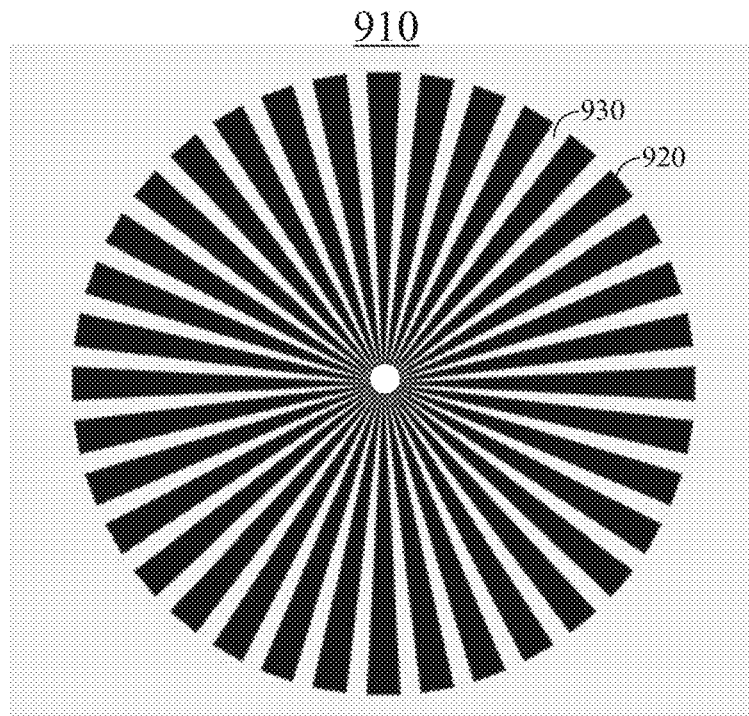
FIG. 9A is a horizontal cross-sectional view of an example mold insert, according to certain embodiments.

FIG. 9A is a horizontal cross-sectional view of an example mold insert 910, according to certain embodiments. Mold insert 910 may include heat sink elements 920 and cooling channels 930 extending radially from the center of mold insert 910 to the edges of mold insert 910. In some implementations, the width of heat sink elements 920 may increase gradually while heat sink elements 920 extend radially from the center of mold insert 910 to the edges of mold insert 910. In some implementations, the width of heat sink elements 920 may decrease gradually as heat sink elements 920 extend radially from the center of mold insert 910 to the edges of mold insert 910. The height (i.e., the length in the vertical direction) of heat sink elements 920 may be constant or may vary (e.g., decrease gradually) as heat sink elements 920 extend radially from the center of mold insert 910 to the edges of mold insert 910.

Figure 9B:
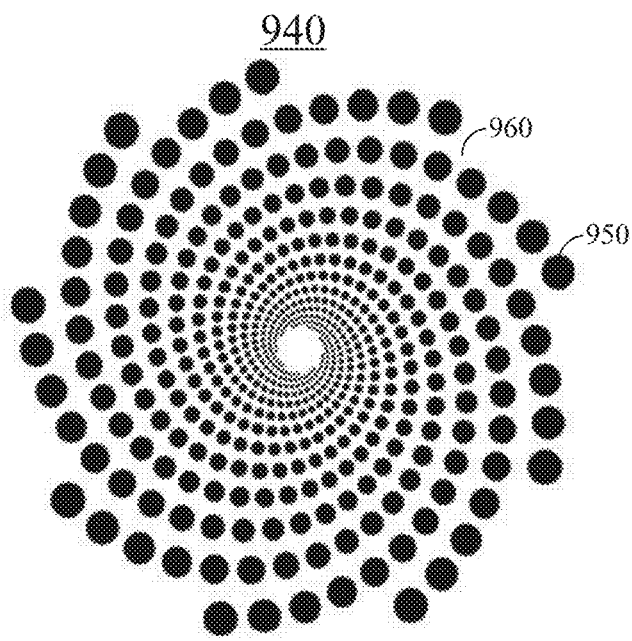
FIG. 9B is a horizontal cross-sectional view of an example mold insert, according to certain embodiments.

FIG. 9B is a horizontal cross-sectional view of an example mold insert 940, according to certain embodiments. Mold insert 940 may include individual heat sink elements 950 of different sizes and arranged in a radial and/or spiral pattern. As such, cooling channels 960 may exist between two adjacent individual heat sink elements 950. Heat sink elements 950 may have various sizes and/or cross-sectional shapes.

Figure 9C:
FIG. 9C is a horizontal cross-sectional view of an example heat sink element, according to certain embodiments.

FIG. 9C is a cross-sectional view of an example heat sink element 950, according to certain embodiments. In the example shown in FIG. 9C, the cross-section of heat sink element 950 may be a concave polygon in order to increase the surface area. In some implementations, heat sink element 950 having a cross-section in the shape of an irregular concave or convex polygon may be used. In some implementations, heat sink element 950 having a cross-section in the shape of any irregular shape may be used. In some implementations, the surface of heat sink element 950 may be a rough surface.

It is noted that the embodiments described above are just some example configurations of the heat sink elements on a mold insert. A person skilled in the art would understand that there may be many different ways to configure the heat sink elements (and cooling channels) to achieve different total thermal resistances in different areas of the mold insert such that areas of the mold insert corresponding to thicker regions of the molded component may have a lower thermal resistance than areas of the mold insert corresponding to thinner regions of the molded component. Similarly, various configurations of the cooling channels may be used such that the cooling fluid may be first supplied to regions of the mold insert that correspond to thicker regions of the molded component to create a larger temperature difference between the molded component and the cooling fluid (or surfaces of the heat sink elements in contact with the cooling fluid) in areas of the mold insert corresponding to thicker regions of the molded component.

In some embodiments, in addition to the configuration of the heat sink elements and the cooling channels, a phase-change material (e.g., wax) that can absorb or release a large amount of thermal energy while maintaining a substantially constant temperature during the phase transition may also be used in the mold insert to achieve the desired isothermal condition at the interface between the molded component and the mold insert. For example, the phase-change material may be used in areas where the thickness of the molded component is lower, such that the temperature at these areas may remain substantially the same during the phase transition of the phase-change material, rather than reducing quickly and causing a large temperature difference between areas where the thickness of the molded component is lower and areas where the thickness of the molded component is higher. In some implementations, the phase-change material may be coated on the surfaces of heat sink elements near the edges of the mold insert where the molded component may have a lower thickness.

The techniques disclosed above may be used in any molding technique that includes a cooling process, such as precision glass molding and injection modeling. The techniques disclosed above may be used to mold components of various materials, such as glass, metal, polymer, plastic, etc. An example method for molding optical components of various materials using the cooling techniques disclosed herein is described in the following section.

Figure 10:
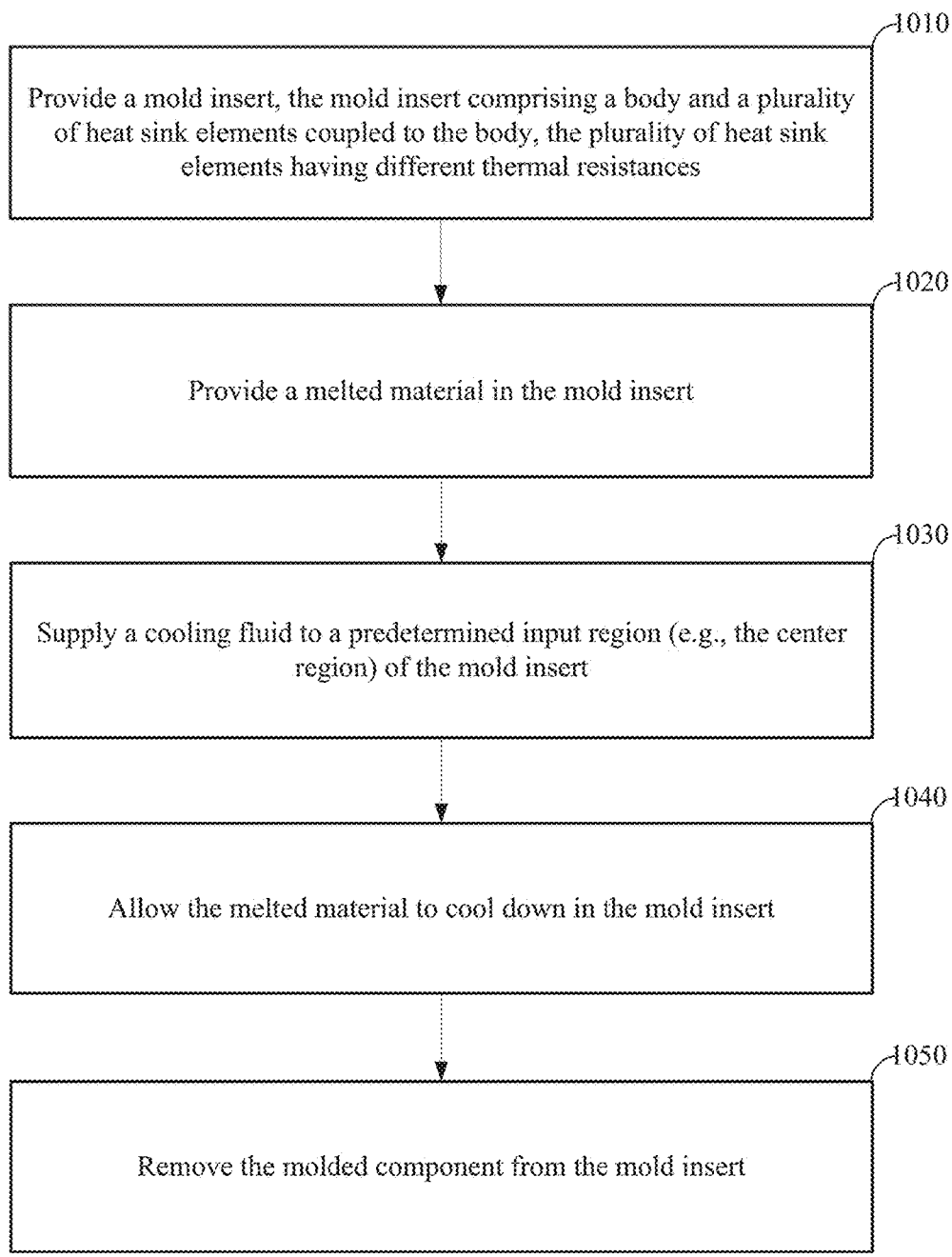
FIG. 10 is a flow chart illustrating an example method of molding an optical component, according to certain embodiments.

FIG. 10 is a flow chart 1000 illustrating an example method of molding an optical component, according to certain embodiments. The method may be used for injection molding, precision glass molding, or any other molding techniques that may include a cooling process.

At block 1010, one or more mold inserts may be provided to a molding machine. Each of the one or more mold inserts may include a body and a plurality of heat sink elements coupled to the body. The one or more mold inserts may form a cavity having a shape matching the shape of the desired component. The plurality of heat sink elements at different regions of the mold inserts may have different thermal resistances. For example, the thermal resistance of a heat sink element in a region with a higher cavity depth may be lower than a thermal resistance of a heat sink element in a region with a lower cavity depth. The heat sink elements may also form cooling channels between the heat sink elements.

At block 1020, a melted raw material may be provided to the mold insert and be pressed by the mold insert. As described above, the melted raw material may be provided to the mold insert in different ways for different molding techniques. For example, in injection molding, the raw material may be melted and then injected into the cavity. In PGM, a glass preform may be provided to the cavity first, and the glass preform and the mold insert may then be heated to a temperature near the melting temperature of the glass preform. The melted material may be pressed by the mold insert to form a component of a desired shape.

At block 1030, a cooling fluid may be supplied to the mold insert. The cooling fluid may flow through the cooling channels, and may absorb thermal energy while passing through the cooling channels to take thermal energy away from the mold insert. In some embodiments, the cooling fluid may be supplied to the mold insert from a predetermined input region (e.g., the center region) of the mold insert, such that the temperature difference between the molded component and the surface of the heat sink elements (and thus the heat dissipation rate) may be different in different regions. In some cases, the flow rate, flow pattern, and/or temperature of the cooling fluid may be varied during the cooling process.

At block 1040, the molded component may be cooled down, for example, by a cooling fluid that flows through the cooling channels in the mold insert. The molded component may be cooled down to a desired temperature at which the molded component may be mechanically and optically stable even when the temperature drops further, and the molded component may be handled safely.

At block 1050, the molded component may be removed from the mold insert and the same molding process may begin for a new component. The molded component may be further processed by, for example, edge polishing and anti-reflection coating processes.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

It will be apparent to those skilled in the art that substantial variations may be made in accordance with specific requirements. For example, customized or special-purpose hardware might also be used, and/or particular elements might be implemented in hardware controlled by software. Further, connection to other computing devices such as network input/output devices may be employed.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Where devices, systems, components, or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A mold insert comprising:
    a body including an area with a recessed surface; and
    a plurality of heat sink elements coupled to the body,
    wherein:
        the recessed surface has different depths in a plurality of different regions of the mold insert; and
        the plurality of heat sink elements are configured to provide different thermal resistances in the plurality of different regions of the mold insert,
        wherein a thermal resistance of the mold insert including the body and the plurality of heat sink elements in a region with a higher recessed surface depth is lower than a thermal resistance of the mold insert in a region with a lower recessed surface depth such that the recessed surface of the body at the region with the higher recessed surface depth and the recessed surface of the body at the region with the lower recessed surface depth are in thermal equilibrium during a cooling process.

2. The mold insert of claim 1, wherein the plurality of heat sink elements include heat sink elements of different dimensions, structures, shapes, or separation distances.

3. The mold insert of claim 1, wherein the plurality of heat sink elements include a plurality of pins, rods, spikes, straight fins, or flared fins.

4. The mold insert of claim 1, wherein at least some of the heat sink elements have uneven surfaces.

5. The mold insert of claim 1, wherein at least some of the heat sink elements include internal tunnels for conducting a cooling fluid.

6. The mold insert of claim 1, wherein a ratio between a maximum depth of the recessed surface and a minimum depth of the recessed surface is greater than 3.

7. The mold insert of claim 1, wherein:
the recessed surface has a maximum depth in a center region of the mold insert; and
the mold insert includes a conduit for conducting a cooling fluid to the mold insert, the conduit located in the center region of the mold insert.

8. The mold insert of claim 7, wherein:
the cooling fluid includes an air or a liquid.

9. The mold insert of claim 7, wherein:
the plurality of heat sink elements are configured to form paths for conducting the cooling fluid from the center region to edges of the mold insert.

10. The mold insert of claim 9, wherein the paths include radial paths or a spiral path.

11. The mold insert of claim 1, wherein a total thermal resistance in any region within the area with the recessed surface is in a range between 95% and 105% of a threshold value, the total thermal resistance in a region including the thermal resistance of the mold insert in the region and a thermal resistance of a component to be molded with the mold insert in the region.

12. The mold insert of claim 1, wherein at least some heat sink elements from the plurality of heat sink elements that are near edges of the mold insert are coated with a phase-change material.

13. The mold insert of claim 1, wherein the mold insert is manufactured using a three-dimensional printing process.

14. A molding system comprising:
a mold insert comprising:
a body including an area with a recessed surface; and
a plurality of heat sink elements coupled to the body,
wherein:
the recessed surface has different depths in a plurality of different regions of the mold insert; and
the plurality of heat sink elements are configured to provide different thermal resistances in the plurality of different regions of the mold insert,
wherein a thermal resistance of the mold insert including the body and the plurality of heat sink elements in a region with a higher recessed surface depth is lower than a thermal resistance of the mold insert in a region with a lower recessed surface depth such that the recessed surface of the body at the region with the higher recessed surface depth and the recessed surface of the body at the region with the lower recessed surface depth are in thermal equilibrium during a cooling process.

15. The molding system of claim 14, wherein the plurality of heat sink elements include heat sink elements of different dimensions, structures, shapes, or separation distances.

16. The molding system of claim 14, wherein the plurality of heat sink elements are configured to form paths for conducting a cooling fluid from a center region of the mold insert to edges of the mold insert.

17. The molding system of claim 14, wherein a total thermal resistance in any region within the area with the recessed surface is in a range between 95% and 105% of a threshold value, the total thermal resistance in a region including the thermal resistance of the mold insert in the region and a thermal resistance of a component to be molded with the mold insert in the region.

18. A method of molding an optical device, the method comprising:
providing a mold insert, the mold insert comprising a body and a plurality of heat sink elements coupled to the body, wherein:
the body including an area with a recessed surface;
the recessed surface has different depths in a plurality of different regions of the mold insert;
the plurality of heat sink elements are configured to provide different thermal resistances in the plurality of different regions of the mold insert; and
a thermal resistance of the mold insert including the body and the plurality of heat sink elements in a region with a higher recessed surface depth is lower than a thermal resistance of the mold insert in a region with a lower recessed surface depth such that the recessed surface of the body at the region with the higher recessed surface depth and the recessed surface of the body at the region with the lower recessed surface depth are in thermal equilibrium during a cooling process;
providing a melted material in the mold insert;
allowing the melted material to cool down; and
removing the optical device from the mold insert.

19. The method of claim 18, wherein:
the recessed surface has a maximum depth in a center region of the mold insert;
the plurality of heat sink elements form paths for conducting a cooling fluid from the center region of the mold insert to edges of the mold insert; and
the method further comprises supplying the cooling fluid to the center region of the mold insert.

20. The method of claim 19, wherein:
the mold insert is configured and the cooling fluid is supplied to maintain an isothermal condition at the recessed surface.

\* \* \* \* \*